Patented Nov. 25, 1947

2,431,327

UNITED STATES PATENT OFFICE 2,431,327

REFRACTORY AND METHOD OF MAKING SAME

Charles F. Geiger, Metuchen, N. J., assignor to The Carborundum Company, Niagara Falls, N. Y., a corporation of Delaware No Drawing. Application August 3, 1943, Serial No. 497,262

11 Claims. (Cl. 106—44)

This invention relates to a novel refractory material and to the method of making it. The object of the invention is to produce a refractory composed of substantial amounts of self-bonded silicon carbide, which refractory can be made in relatively thin sections, which has a high load carrying capacity, which is highly resistant to thermal shocks, and which is highly oxidation resistant. The refractory material covered by the present invention may be used as setter tiles, bricks, and various other articles of any shape desired for use particularly in applications where a material having good strength at elevated temperatures is required.

The method of the present invention is distinguished from the prior-art, in several important respects, one of which being that a relatively low temperature is required in the operation in which the material is fired. Because a low temperature is used, the process results in substantial savings because of the cost of power or fuel required to fire the refractory and also because a cheaper, lower temperature kiln may be used in its manufacture than is possible with the practice of the prior-art methods of making self-bonded silicon carbide refractories. Bonded refractory materials containing a substantial amount of self-bonded silicon carbide, which are made by use of prior-art methods, have been found to have relatively poor mechanical strengths at elevated temperatures and to be prone to the development of cracks as a consequence of rapid changes of temperature. On the other hand the refractory of the present invention may be made in very thin sections where the particular application requires it, and yet will sustain high stresses throughout a long period of time at elevated temperatures. Such refractory will endure numerous rapid changes of temperature without cracking or sagging, and is also highly resistant to oxidation at high temperatures.

The method of the present invention consists, in one modification thereof, in heating an intimate mixture of finely divided carbon and finely divided silicon which have been molded and formed to the desired shape, at a relatively low temperature, namely, from approximately 1200° C. to 1500° C. When approximately stoichiometric proportions are used and the mixture is so heated for a suitable length of time under reducing or non-oxidizing conditions the carbon and silicon react substantially completely to form silicon carbide.

Such silicon carbide is not the type obtained in the silicon carbide furnace which is conventionally used in the prior-art, wherein a mixture of sand and carbon is packed around an elongated graphite core and is heated to an extremely high temperature, as for example, from 2000° C. to 2600° C. The silicon carbide resulting from such conventional method of manufacture is in the form of either large platy crystals or elongated needlelike crystals, both of which are hexagonal in crystal habit. In the method of the present invention, because of the low temperatures employed, the silicon carbide, of which the product is composed wholly or in part, is in the form of very small crystals, so small in fact that when examined by the naked eye they appear to be amorphous. However, upon examination, as by use of X-ray diffraction patterns, the product is found to be crystallized with a cubic habit.

In the modification of the process above described the product consists substantially wholly of such cubic silicon carbide with the minute crystals closely interlocked so that the product has a very high mechanical strength. In other modifications of my invention, which are employed where products having properties different from those of the product above described are desired, I may employ a substantial amount of filler material which is incorporated initially with the mixture of carbon and silicon. Such filler material may be, for example, ordinary hexagonal silicon carbide of one or more mesh sizes, alumina, mullite, kyanite, or other refractory grain, or it may be a clay. When sufficient clay is used to act as a supplementary bond, as for instance when 20–30% by weight of the product is employed, the product has a mechanical strength and toughness which allow it to withstand especially hard use in the way of mechanical and heat shocks.

Two or more of such filler materials may be used together. In cases where such filler materials are used, the product consists of such filler uniformly distributed throughout the resulting refractory shape and a bond of interlocked cubic silicon carbide crystals. It is possible, by use of the filler or varying amounts of clay to modify and predetermine such properties of the refractory as mechanical strength, coefficient of expansion, heat conductivity, and resistance to thermal shock.

The cubic silicon carbide formed as a result of the reaction between the carbon and silicon of the mixture bonds itself and the filler material, if such is used, into a strong coherent mass by reason of the interlocking of the cubic silicon carbide crystals with each other and the granular filler, and by reason of the at least partial interdiffusion between adjacent cubic silicon carbide crystals. When the refractory is employed at temperatures above that at which it was formed, it is self-strengthening, since such temperature will further the inter-diffusion between silicon carbide crystals. If such temperature is high enough, the cubic silicon carbide changes partially or wholly to hexagonal silicon carbide with the crystals strongly interlocked or joined. The product of the present invention is therefore self-strengthening under high temperature operating conditions.

The process of the present invention is carried out as follows: The components of the mixture of which the refractory is to be composed, as for instance, finely divided carbon and finely divided silicon, if no filler is to be employed, or such material plus hexagonal silicon carbide in the desired grit size where such material is to be used as a filler, are thoroughly mixed for a long enough time to insure uniform distribution of the components throughout the mixture. In order to permit the mixture to be molded, a temporary binder is added. Any of the usual and well known temporary binders or resins of both dry and liquid form may be used alone or in workable combinations. The mix is then formed by the usual forming methods, under pressures equivalent to 1000–7000 lbs. per square inch, after which the shapes are slowly dried in an oven at moderate temperature. After drying, the shapes are fired in a kiln under either reducing or non-oxidizing conditions. In one method the shapes are packed in coke which, upon heating, provides a reducing atmosphere. In another method, a furnace into which is introduced either a reducing or non-oxidizing gaseous atmosphere is employed.

The heating cycle employed for such firing operation may obviously be varied considerably. Naturally, the cycle should be such as to heat the shapes gradually enough to prevent their being cracked. The shapes should then be held at a temperature of from 1200° to 1500° C., or slightly above, for a long enough period to insure complete reaction between the carbon and the silicon metal. No definite figures can be given for the length of holding of the product at this temperature since this obviously depends to some extent upon the thickness of the cross-section of the product. As an example only, where a relatively thin setter tile is made, it has been found satisfactory to heat the product from room temperature to approximately 1250° C. in a period of twelve hours, to then slowly raise the temperature over a period of eighteen hours to about 1450° C. and to cool it back to room temperature at a rate comparable to the rate of heating.

As has been indicated above, the composition of the product may be widely varied, depending upon the use for which it is intended. The ratio of the weight of silicon to the weight of carbon employed in the practice of this invention should be such generally to provide for their complete reaction to form silicon carbide. In other words, the ratio should be at least the stoichiometric ratio of silicon to carbon, namely, 2.34. In some instances it is desired that metallic silicon be present as such in the finished product; in these cases the silicon is employed in excess of the stoichiometric ratio. For the purpose of my invention the ratio $$\frac{\text{weight of silicon}}{\text{weight of carbon}}$$

should usually lie between approximately 2.34 and 3 depending upon the conditions employed in firing. Where an excess of silicon is employed the product has a shiny submetallic appearance and possesses more strength than where elemental silicon per se is not present.

Is has been found that the resulting refractory is stronger and more oxidation resistant when an excess of silicon is employed than when it consists of cubic SiC alone. This may possibly be explained by the formation of coatings of silicon on the grain. Subsequent oxidation of the silicon provides a protective coating for the grain; such a formation of $SiO_2$ in situ effects an enhancement in strength of the refractory at high temperatures.

As indicated above no filler need be used in the mixture in the practice of my invention. In some instances, granular hexagonal silicon carbide uniformly distributed throughout the product has been found to be desirable. I have found that a satisfactory product results when using such granular hexagonal silicon carbide as a filler, when amounts lying anywhere within the range from 0 to 80% by weight of the product are employed. When clay is used as a filler or supplementary bond, the amounts of clay may lie anywhere within the range from 0 to 30% by weight of the product. In no instance, whether one or more fillers are used, does their sum exceed 90% by weight of the product. The refractory of the present invention has a composition by weight falling within the following limits:

|  | Per cent |
|---|---|
| Refractory filler | 0–90 |
| Supplementary clay bond | 0–30 |
| Si (total) | 6–75 |
| C | 2–30 | the sum of the supplementary clay bond and refractory filler, if both are used together, not to exceed 90%, the ratio $$\frac{\text{Si}}{\text{C}}$$

lying between 2.34 and 3. In the finished refractory, uncombined silicon plus cubic silicon carbide compose from 20–100% by weight, and uncombined silicon from 0–16.65% by weight of the product.

For purposes of illustration only, and not in any way to be considered as restricting the invention, the following examples of typical mixtures falling within the scope of my invention are given: All parts given below are by weight; sufficient water is added in each instance to produce the working properties needed for the forming process to be employed. Likewise the amounts of temporary binders employed will be such as to suit the requirements of process to be used.

Example I: Parts
    Powdered silicon_____ 70
    Carbon _____ 30
    Temporary binder_____ 0–5

Example II: Parts
    14 mesh and finer hexagonal silicon carbide_____ 60
    Powdered silicon_____ 28
    Lamp black_____ 12
    Temporary binder_____ 0–5

Example III: Parts
    14 mesh and finer hexagonal silicon carbide_____ 75
    Powdered silicon_____ 20
    Lamp black_____ 7½
    Temporary binder_____ 0–5

Example IV: Parts
    68 mesh and finer hexagonal silicon carbide_____ 30
    Powdered silicon_____ 28
    Lamp black_____ 12
    Clay_____ 20
    Temporary binder_____ 0–3

Use of a non-oxidizing or reducing atmosphere during the burning of the product of my invention has been found to be an important feature of my method. Such atmosphere prevents contamination of the product or change of weight thereof by reason of oxidation. Furthermore, by use of such atmosphere it can be told with a certainty what the composition of the burned product will be from a consideration of the character and amount of the components of the mixture from which it was made. Thus, if a stoichiometric ratio of carbon and silicon is employed in the mixture, one is assured that the product will consist substantially wholly of cubic silicon carbide, with no appreciable excess of either carbon or silicon. Without the use of such atmospheres there occur relatively large losses of silicon by vaporization and losses of carbon by oxidation especially from the outer portions of the product; when this takes place the composition of the product is not uniform and is not subject to the rigid control made possible by the practice of my invention.

Although silicon has been described as being used in that form, it is obvious that the silicon may be derived from finely comminuted alloy which is employed in the mix instead of silicon. Such alloy may be, for example, an aluminum-silicon alloy or a ferro-silicon having a high silicon content, for example, 90%. In the examples given above the carbon is added to the mixture in the form of lamp black. It is to be understood that carbon in other finely divided forms may be employed in the process. Thus, for instance, powdered retort carbon or powdered coke may be employed in the practice of the invention.

It will be obvious to those skilled in the art that modifications may be made in the details of procedure and in the character and amounts of the materials used without departing from the spirit of the invention. The scope of the invention is thereby defined by the following claims.

I claim:

1. The process of manufacturing refractory articles comprising forming a mix consisting of silicon carbide grain of hexagonal crystal habit, powdered silicon, and finely divided carbon, the ratio of the weight of silicon to the weight of finely divided carbon in the mix lying between 2.34 and 3, the hexagonal silicon carbide grain being present in the range from a substantial amount to 90% by weight of the total mixture, mixing such components thoroughly with a temporary binder so that the mixture is rendered workable, forming the mixture to shape, drying the shape, and firing it in a non-oxidizing or reducing atmosphere within the temperature range of 1200° C. to 1500° C. for such a period of time that a substantial portion of the silicon reacts with the finely divided carbon to form cubic silicon carbide crystals which are so interlocked with each other and the hexagonal silicon carbide grain that a mechanically strong shape results.

2. The process of manufacturing refractory articles comprising forming a mix consisting of refractory filler material in granulated form, powdered silicon, and finely divided carbon, the ratio of the weight of silicon to the weight of finely divided carbon in the mix lying between 2.34 and 3, the filler being present in the range from a substantial amount to 90% by weight of the total mixture, mixing such components thoroughly with a temporary binder so that the mixture is rendered workable, forming the mixture to shape, drying the shape, and firing it in a non-oxidizing or reducing atmosphere at a temperature of at least 1200° C. for such a period of time that a substantial portion of the silicon reacts with the finely divided carbon to form cubic silicon carbide crystals which are so interlocked with each other and the filler that a mechanically strong shape results.

3. The process of manufacturing refractory articles comprising forming a mix consisting of powdered silicon and finely divided carbon, the ratio of the weight of silicon to the weight of finely divided carbon in the mix lying between 2.34 and 3, mixing such components thoroughly with a temporary binder so that the mixture is rendered workable, forming the mixture to shape, drying the shape and firing it in a non-oxidizing or reducing atmosphere within the temperature range of 1200° C. to 1500° C. for such a period of time that a substantial portion of the silicon reacts with the finely divided carbon to form cubic silicon carbide crystals which are so interlocked with each other that a mechanically strong shape results.

4. The process of manufacturing refractory articles comprising forming a mix comprising substantial amounts of powdered silicon and finely divided carbon, the ratio of the weight of silicon to the weight of finely divided carbon in the mix lying between 2.34 and 3, mixing such components thoroughly with a temporary binder so that the mixture is rendered workable, forming the mixture to shape, drying the shape, and firing it in a nonoxidizing or reducing atmosphere at a temperature of at least 1200° C. for such a period of time that a substantial portion of the silicon reacts with the finely divided carbon to form cubic silicon carbide crystals which are so interlocked with each other that a mechanically strong shape results.

5. A refractory article consisting of from a substantial amount up to 90% by weight of the article of granular refractory filler material other than carbon or graphite, the remainder of the refractory article being substantially all cubic silicon carbide, the refractory filler meterial and the cubic silicon carbide being distributed throughout the article in a substantially uniform manner, the cubic silicon carbide crystals being interlocked and at least partially interdiffused with each other.

6. A refractory article consisting of from a substantial amount up to 90% by weight of the article of silicon carbide grain of hexagonal crystal habit, the remainder of the refractory article being substantially all cubic silicon carbide, the hexagonal silicon carbide and the cubic silicon carbide being distributed throughout the article in a substantially uniform manner, the cubic silicon carbide crystals being interlocked with each other and with the hexagonal silicon carbide grain and at least partially interdiffused with each other.

7. A refractory article consisting of a shaped silicon carbide refractory article of manufacture composed substantially all of cubic silicon carbide crystals, the cubic silicon carbide crystals being interlocked and at least partially interdiffused with each other.

8. A refractory article consisting of a shaped silicon carbide refractory article of manufacture consisting of cubic silicon carbide, granular silicon carbide of hexagonal crystal habit, and up to 16.65% by weight of the article of elemental silicon, the cubic silicon carbide crystals being interlocked and at least partially interdiffused with each other.

9. A refractory article consisting of silicon carbide grain of hexagonal crystal habit within the limits of 0-80% by weight of the article, the remainder of the article being composed substantially all of elemental silicon and cubic silicon carbide, the silicon plus the cubic silicon carbide composing from 20% to substantially 100% by weight of the article and the elemental silicon being present in amounts up to 16.65% by weight of the article, the hexagonal silicon carbide grain, elemental silicon, and cubic silicon carbide crystals being distributed throughout the body of the refractory article in a substantially uniform manner.

10. A refractory article consisting of granulated refractory filler material other than carbon or graphite within the limits of 0-80% by weight of the article, the remainder of the article being composed substantially all of elemental silicon and cubic silicon carbide, the silicon plus the cubic silicon carbide composing from 20% to substantially 100% by weight of the article, and the elemental silicon being present in amounts up to 16.65% by weight of the article, the granular filler material, elemental silicon, and cubic silicon carbide being distributed throughout the body of the refractory article in a substantially uniform manner.

11. A refractory article consisting of elemental silicon and cubic silicon carbide, the silicon being present in amounts up to 16.65% by weight of the article, the remainder being substantially all cubic silicon carbide, the elemental silicon and cubic silicon carbide being distributed throughout the body of the refractory article in a substantially uniform manner.

CHARLES F. GEIGER.

REFERENCES CITED

The following references are of record in the file of this patent:

UNITED STATES PATENTS

| Number | Name | Date |
|---|---|---|
| 2,004,594 | Benner et al. | June 11, 1935 |
| 1,873,071 | Tone | Aug. 23, 1932 |
| 1,012,531 | Egly | Dec. 19, 1911 |
| 1,013,701 | Tone | Jan. 2, 1912 |
| 1,030,327 | Patter | June 25, 1912 |
| 1,483,507 | Brockbank | Feb. 12, 1924 |
| 1,868,631 | Doidge | July 26, 1932 |
| 2,005,956 | Ridgway | June 25, 1935 |
| 1,937,060 | Hutchins | Nov. 28, 1933 |
| 1,331,435 | Hutchins | Feb. 17, 1920 |

FOREIGN PATENTS

| Number | Country | Date |
|---|---|---|
| 5,161 | Great Britain | 1910 |
| 30,869 | Austria | 1907 |

OTHER REFERENCES

Inorganic and Theoretical Chemistry by Mellor, vol. V, pages 876 and 879; Longmans, London (1924).